April 25, 1950  J. A. MEAD  2,505,686
GYRO ERECTION SYSTEM
Filed Sept. 18, 1944
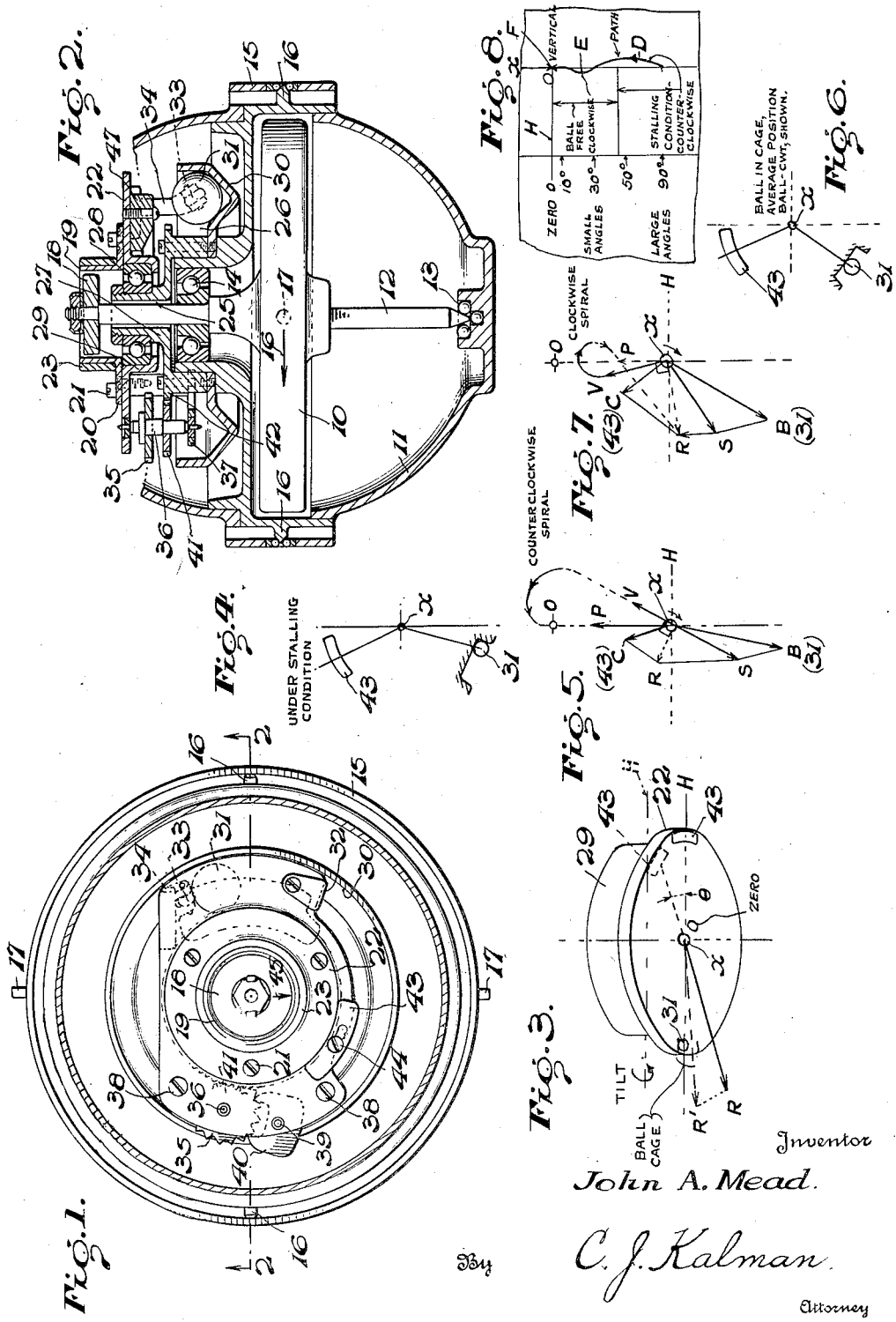
Inventor
John A. Mead.
By C. J. Kalman
Attorney Patented Apr. 25, 1950

2,505,686

UNITED STATES PATENT OFFICE 2,505,686

GYRO ERECTION SYSTEM

John A. Mead, Fairlawn, N. J., assignor to Bendix Aviation Corporation, Teterboro, N. J., a corporation of Delaware Application September 18, 1944, Serial No. 554,710

4 Claims. (Cl. 74—5.44)

This invention relates to gyroscopic devices of the type adapted for indicating the true vertical so as to provide an artificial horizon on moving vehicles such, for example, as aircraft, and more particularly to self-erecting means for such devices for maintaining the gyro spin axis vertical notwithstanding bearing friction or the presence of acceleration forces.

Devices of this general nature are known in the art, as represented by the United States patent to Robert Alkan, 2,159,118, issued May 23, 1939, and utilize slip-drive connections between the erecting mechanism and the rotor whereby the erecting mechanism is driven at a speed substantially less than the speed of rotation of the rotor. Due to the fact that slip-drive connections are subject to fluctuations for various reasons they will not, of themselves, maintain the speed of the erecting mechanism substantially constant.

It has also been proposed to employ in lieu of a slip-driving means such as employed in the patent to Alken above referred to, a positively driven regulating or escapement mechanism constituting a retarding means to produce a variable retarding action on the rotatably driven carriage forming a part of the erecting means, but it has been found that the return of the gyro spin axis to a vertical position, is not sufficiently direct to entirely overcome spiraling in the precessional movement. It is therefore an important object of the present invention to provide novel means to more directly return the gyro spin axis to a vertical position in all angles of tilt, whether large or small, so that more accurate reading or indication of the true vertical such as to provide an artificial horizon is made possible.

Another object is to provide a novel erecting means for a gyro vertical or artificial horizon in which there is provided a counter-weight, and a rolling mass or ball, so proportioned in weight and position relative to each other as to lessen or retard the actual precession, such as on a turn, and even though the erection rate is slower, it is accomplished more quickly and more directly since there is less deflection or precession, the degree or angle of restoring precession is less, thereby to return the gyro spin axis to a vertical position without spiraling or overrunning the vertical to any appreciable degree and approach it slowly and asymptotically.

Specifically, the improvement consists in providing a counter-weight in addition to those formed by the rolling ball or escapement mechanism and the anchor thereof, which is lighter in weight than the weight or mass of the rolling ball and so positioned relative thereto as to always be at an obtuse angle greater than 90° and less than 180° therefrom, to give a more improved and effective and direct return or precession of the gyro spin axis to a true vertical position.

It is an object of the present invention, therefore, to provide a novel gyro vertical or artificial horizon wherein the foregoing disadvantageous spiraling is overcome and a desirably stabilized platform or reference is provided.

Another object of the present invention is to provide a gyro vertical or artificial horizon with novel erecting means for accurately maintaining the gyro spin axis in its normally vertical position.

Another object of the invention is to provide a gyro vertical or artificial horizon having novel means for rapidly damping the oscillations or precession of the gyroscope about its position of equilibrium.

A still further object is to provide a novel gyro vertical or artificial horizon in which disturbances thereof due to acceleration forces or bearing friction are substantially reduced thereby improving the character of the gyroscope as a navigational instrument.

Another object of the invention is to provide in a gyro vertical or artificial horizon including a gyroscope having normally vertical spin axis and having a Cardan suspension, i. e., mounted in gimbals for angular movement about two mutually perpendicular horizontal axes at right angles to said spin axis, novel means for maintaining said spin axis vertical comprising a supporting frame or carriage rotatable about the spin axis of said gyroscope, driving means driven by said gyroscope or rotor thereof coaxial therewith for rotating said frame about said spin axis at a speed substantially less than the speed of said rotor, a counter-weight auxiliary to that formed by the escapement mechanism including its anchor and operating in conjunction with a weighted mass in the form of a rolling ball having a limited movement in an arcuate path, and so related thereto in weight and position that the component moments thereof are such as to effect a stabilization or precession of the rotor spin axis to vertical more directly than heretofore accomplished.

A still further object is to provide a novel erection system including a counter-weight lighter than the rolling ball and which leads it by >90° and <180°, in which erecting forces are produced on the gyroscope to constantly keep or more directly return its spin axis to vertical.

A still further object of the invention is to provide a novel and improved erection system in which erecting forces are set up so that the gyro precesses less as on a turn by reason of being retarded, dampened or partly restrained, and tends to erect its spin axis more directly and therefore more quickly since the required movement is much less, or return the gyroscope to vertical in a direction of the acceleration of its axis by a creeping or more direct precessional movement even though slightly slower, so that the gyro axis does not overrun or overshoot the vertical or to any appreciable degree and at a very small angle with respect to the vertical say of 2 minutes, but approaches it asymptotically and not by a long spiral precessional movement.

A still further object is to provide a novel and improved erection system for gyroscopes which employs a counter-weight lighter than the ball and so positioned and angularly related to the ball as to lead it by greater than 90° and less than 180°, to produce in conjunction with the pendulosity of the gyroscope, an average resultant substantially normal to the plane of the axis of rotation of the gyro spin axis and the dynamic vertical, whereby a substantially lineal erection is obtained.

Another object is to provide a novel erection system for gyroscopes in which counter-weights are so arranged relatively in position and weight as to give a resultant near horizontal in all angles of tilt of the gyro spin axis.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention.

Figure 1 is a top plan view, partly in section, of a gyro vertical embodying the present invention or improved erecting means.

Figure 2 is a vertical section partly in elevation, taken along the section line 2—2 of Figure 1.

Figure 3 is a schematic view in perspective showing in graphic form, the vectors representing the effective forces of the present erection system.

Figure 4 is a schematic view showing the relation of the counter-weight of the present invention to the ball under a stalling condition with the ball at one, i. e., the lower end of its cage.

Figure 5 is a graph showing the vectors of the effective or resultant forces of the present erection system when the ball is in a stalling condition as shown in Figure 4.

Figure 6 is a view similar to Figure 4 but showing the ball moving in its race or cage with respect to the counter-weight and in the relation thereof in the average condition.

Figure 7 is a view similar to Figure 5 showing the vectors of the effective or resultant forces of the present erection system with the counter-weight and ball related in position as shown in Figure 6; and Figure 8 is a graph showing schematically the manner in which the system works to cause the gyro spin axis to slowly move or creep to a vertical position more directly and without spiraling.

The improved navigational device embodying the present invention comprises a gyroscope or gyro vertical having a gyro rotor mounted in a Cardan gimbal suspension for spinning about a normally vertical axis and for angular movement about two mutually perpendicular horizontal axes at right angles to the spin axis, the rotor being enclosed and journalled in a casing carried by the gimbal suspension. The gyro rotor may be driven electrically or in any other suitable and desirable manner known in the art.

The mechanism for stabilizing the gyroscope and, thus, maintaining its spin axis vertical in order that the gyroscope may serve as a gyro vertical or artificial horizon, comprises a weighted mass arranged to travel in a circular path about the rotor spin axis. For this latter purpose there are provided supporting means in the form of a carriage mounted for rotation with the gyro rotor to guide the mass about the rotor spin axis.

Driving means in the form of an eddy current drag coupling are provided for driving the supporting means and the mass about its circular path at a speed substantially smaller than the speed of rotation of the gyro rotor. Novel braking means are provided in the form of a positively driven regulating or escapement mechanism for variably retarding and maintaining the speed of rotation of the supporting means and the mass at a substantially constant speed. For example, the supporting means may rotate at a speed of only a few dozens of revolutions per minute, while the gyro rotor may have a speed of several thousand revolutions per minute.

As soon as the gyro spin axis departs from its normally vertical position, due to bearing friction, accelerations or other disturbing forces, the weighted mass cooperates with the braking means to cause the latter to produce a variable retarding action on the supporting means whereby erecting forces are developed which return the gyro spin axis back to its normal vertical position at which time the supporting means and the mass are again brought back to a constant speed.

While the invention is shown applied to a gyroscope having a positive drive and escapement mechanism serving to produce a variable retarding action on the rotatable frame or carriage, and hence on the weight or weights, whereby erecting forces are produced which return the spin axis of the gyro rotor back to vertical, at which time the frame and weight or weights are brought back to a constant speed, which is a desideratum, it is to be understood that the invention may be applied to a gyroscope having a slip drive such as shown in the Alkan patent above referred to and is especially adapted and efficient for use in connection with either drive or escapement mechanism thereof, and that it will tend to correct the defects and inefficiencies of such a drive as employed by Alkan, and since the present improvement allows less precession, the effect is to more quickly but gradually and directly return the spin axis back to vertical.

Referring now to Figures 1 and 2 of the drawings for a more detailed description, the present invention is shown as comprising a gyroscope including a rotor 10 mounted within a casing 11 for spinning about a normally vertical axis. Rotor 10 is provided with a shaft or trunnion 12 which is secured to the rotor or formed integrally therewith, one end of the shaft being journaled in a bearing 13 at the bottom of the casing 11 while the upper end of the shaft is journaled in a bearing 14 in the upper part of the casing.

Rotor casing 11 is mounted within a Cardan or gimbal suspension comprising a gimbal ring 15 in which the casing is pivoted for angular movement about a horizontal axis formed by trunnions 16, 16, the gimbal ring, in turn, being pivoted for angular movement about a second horizontal axis perpendicular to the first axis, formed by trunnions 17, 17 which are journaled in a fixed support (not shown).

A driving member in the form of a permanent magnet 18 is fastened to the upper extremity of shaft 12 to be rotatable therewith and cooperates with a non-magnetic cylindrical cup member 19 arranged closely adjacent the magnet and having an extending flange 20 by means of which the cup member is fastened through suitable means, such as screws 21, with a supporting means in the form of a carriage 22. If desired, a confining sleeve 23 may be provided for surrounding the cup member.

The upper portion of rotor casing 11 has secured thereto by suitable means, such as bolts 24, a stationary hollow sleeve 25 surrounding shaft 12 and having an enlarged base portion 26 and a reduced upper portion 27, the latter portion supporting bearings 28 which rotatably mount carriage 22 by way of a boss portion 29 carried by or formed integrally with the carriage. As is well known, rotation of magnet 18 in accordance with the rotation of rotor 10 creates eddy currents within cup member 19 whereby local magnetic fields are developed in the latter which coact with the field of the magnet whereupon rotation is imparted to member 19 and carriage 22, the speed of rotation of the carriage being substantially below the speed of rotation of the rotor.

Clamped between the upper portion of rotor casing 11 and the hollow sleeve 25 is a circular track member 30 which defines a path of travel for a weighted mass in the form of a ball 31 which is limited in its rolling motion in a segmental arcuate ball race formed between a downwardly extending limit plate 32 fastened to carriage 22 at a segmental recess and radial shoulder thereof and a roller 33 supported by a bracket 34 which likewise is fastened to the carriage. With the rotor spin axis in a normally vertical position, magnet 18 will cause rotation of carriage 22 and motion of the latter causes ball 31 to roll within track 30, the ball normally resting against roller 33 and being urged to roll thereby (assuming clockwise carriage rotation).

The eddy current coupling drive alone will not insure a substantially constant speed of rotation for carriage 22 as such a coupling is subject to any speed fluctuations arising at the rotor itself and to this end the regulating or escapement mechanism referred to above is provided to insure a substantially constant speed of rotation on the part of the carriage. The mechanism shown is preferred, and comprises a starwheel 35 which is fastened to a shaft 36, the shaft being journaled for rotation within the top of carriage 22 at one end and at another end within a plate 37 secured to the carriage by means of suitable spacers 38. A second shaft 39, likewise rotatably journaled within carriage 22 and plate 37 supports a forked anchor 40 thereon which engages starwheel 35.

The starwheel 35 is rotated by means of a driven pinion 41 which is fastened to shaft 36, the pinion meshing with a stationary gear 42 which may be carried by the enlarged base portion 26 of sleeve 25 or formed as an integral part thereof. Rotatable motion of carriage 22 drives pinion 41 about gear 42 to rotate starwheel 35, the speed of rotation of the latter in turn, being governed by anchor 40 whereby a retarding action is impressed upon carriage rotation to maintain the latter substantially constant by reason of the positive non-slipping drive.

The foregoing structure provides an escapement device having a non-isochronous return, the frequency or period of oscillation of the anchor depending upon the speed of rotation of pinion 41 and starwheel 35 to thus provide a small retarding force on pinion 41 during relatively small speeds and a greater retarding force during increased speeds to maintain the carriage rotation at a substantially constant speed. The pivotal axis 39 of anchor 40 is arranged parallel to the gyro rotor axis and it is advantageous to locate the center of gravity of anchor 40 away from its pivotal axis to thereby form a block oriented in azimuth in such a manner that the period or frequency of oscillation of the anchor and, therefore, the speed of rotation of carriage 22 shall be affected not only by variations of the speed of rotor 10 and shaft 12 but also by acceleration forces impressed upon the anchor.

In the present improvement I also employ counter-weight 43 lighter in weight than the ball 31 and located the same distance radially from the spin axis, in addition to using the counter-weight formed by the escapement mechanism including its anchor 40. This counter-weight 43 is shown in arcuate form concentric to the carriage periphery and gyro spin axis and extending for an angle or arc of approximately 60° circumferentially, and is rigidly but may be adjustably secured or fixed as at 44 by a screw and threaded holes or otherwise, to the rotatably driven supporting frame or carriage 22 in a position substantially diametrically opposite the bracket 34 and roller 33 at its left hand or remote end and from the remote end of the arcuate cage or race of the rolling ball 31, but always between 90° and 180° or at an obtuse angle greater than 90° and less than 180° with respect to the ball 31 in any position of the latter in its cage or race, so as to lead the ball by more than 90° and less than 180°.

Gyros being pendulous, especially in the old form employing a pendulum or weighted pendulous member and slightly pendulous in the improved form shown, it results that if the gyro were not rotating, theoretically, it would tend to move directly to an erect position except in non-pendulous gyros. However, with the gyro spinning, the precession causes the gyro axis to move in a cone or conical path and the pendulosity torque is perpendicular to the precessional movement or forces acting in a horizontal direction tending to restore the gyro spin axis to vertical. However, this pendulosity torque, in viewing the device in the pilot views taken looking down on the axis as in Figures 4 to 7 inclusive, is horizontal toward the vertical axis and the precession is clockwise toward the right, the pendulosity assuming a clockwise direction of rotation, instead of a desired or needed ideal torque horizontally to the left with the precessional movement directly to the vertical or gyro spin axis. In other words, the torque component is 90° from where it should be to cause the gyro to move directly to a vertical position. Viewing the gyro from above, with the gyro moving in a clockwise direction, the pendulosity causes precession in a counter-clockwise direction. What is needed then for maintaining the gyro vertical or a movement directly to the vertical, is a force or torque substantially at right angles to that due to the pendulosity.

While erection systems for gyros have ordinarily been provided with counter-weights, it has been discovered that in accordance with and under the present invention, particularly position and magnitude of the counter-weight 43, especially with respect to its relation to the weighted mass formed by the rolling ball 31, serves together with the pendulosity or torque thereof, to effect a direct erection. It is therefore the purpose of the present invention to so position the counter-weight 43 with respect to the ball 31, in a type of erection system employing such a ball, as to reduce and equalize spiraling throughout the range of displacements of the dynamic vertical observed in flight. It is understood that moving the counter-weight in one direction will affect the erection characteristic in reverse to that obtained in moving the counter-weight in the other direction. For the sake of clearness only, the counter-clockwise movement is described herein as depicted in Figure 3. In this view, in conjunction with the parts schematically represented, a graph or diagram is shown in which at a displacement where the incline is sufficiently shallow or for small angles, as to allow the ball to be constantly driven during the uphill part of the cycle, the instant at which the counter-weight is most effective in overcoming or cancelling the ball weight, is made later in the cycle by moving the counter-weight back or counter-clockwise on the erection system through some angle $\theta$. By thus moving the counter-weight, the vector representing the resultant erection torque OR as represented by the solid line arrow could be rotated to the position OR' as represented by the dotted line arrow and so reduce clockwise spiraling or precessional movement in a cone. At a displacement where the incline is sufficient to cause the ball to stall the erection system, such as represented in Figure 4, this effect can be used to orient OR so that in combination with increased pendulosity effect, a slight counter-clockwise spiral results which is less than heretofore, thus to keep or more directly and with shorter erection movement being required, more quickly return the spin axis to vertical. The magnitude and direction of movements of forces tending to disturb, unbalance or cause deviations of the spin axis of the rotor or gyro vertical from its normally vertical position, due to various causes, such as friction, accelerations or other disturbing forces acting against forces for maintaining the gyro axis vertical, such as the weight or weights rotated with or by the frame or carriage, cooperate with the retarding action on the frame at different positions of its rotation and at varying angles of tilt or inclination, and hence, on the weight or weights, whereby erection forces are produced which return the spin axis of the gyro rotor back to vertical, at which time the frame and weight or weights are brought back to constant speed, are greatly improved and a more direct return of the gyro or rotor spin axis to a vertical position results.

In Figure 4 of the drawings, the relation of the ball to the counter-weight is shown under a stalling condition, so-called, which occurs especially at large angles (e. g. more than 50°) of tilt of the gyro axis. In this condition, the ball 31 is held by gravity against one side or end of the ball race or cage due to the magnetic or other equivalent drive from the gyro itself, as said race or cage and ball 31 on the carriage or supporting frame move down one side and is moving up the other side in a clockwise direction. In this upward movement, the ball is held against one side, i. e., the lower side or end of the race or cage by the erection caused by the direction of movement of the frame or carriage due to the drive from the gyro itself or the rotor thereof being driven at a high speed, due to the magnetic or other coupling provided therebetween. In this condition, the diagrammatic view or graph shown in Figure 5 represents the component forces or vectors resulting from such relation and condition. As previously mentioned, this view as well as Figures 4, 6 and 7, are views looking down on the gyro in the line of its axis of rotation.

In plan views, Figure 5 and in Figure 7, the axis of rotation or spin axis of the gyro is shown intersected by vertical and horizontal lines perpendicular thereto, the vertical lines representing the vertical spin axis and the horizontal lines representing the artificial horizon or horizontal plane of the gyro perpendicular to the spin axis in an erect position. In the plan view Figure 5, O represents the vertical, X the axis of spin, B the torque due to the ball 31; C the torque due to the counter-weight 43; and P the torque due to pendulosity, all indicated by arrowed lines. The sub-resultant torque S for the ball torque B and counter-weight torque C combines with torque P for the pendulosity to form a resultant torque R oriented slightly above horizontal. The precession of the axis is normal to R and is represented by V which is seen to accompany a velocity nearly directly toward O with only a slight tendency toward a counter-clockwise movement. Since the precession is normal to the resultant torque vector R with the result that with the ball in the stalling position or condition on the upgrade travel with the counter-weight and ball in the relation described, there is a slow precession in a counter-clockwise direction to the right of the vertical axis and pendulosity torque vector P as represented by the arrow V. In other words, as the resultant torque vector R is slightly above the horizontal plane as in Figures 4 and 5, it is evident that the precession is slightly counter-clockwise, while if the resultant is below the horizontal as in Figures 6 and 7, the precession would be in a clockwise direction. The latter condition is shown in Figure 7 which depicts the result of the component forces tending to erect the gyro vertical when the counter-weight and ball are in the relation shown in Figure 6 with the ball moving in its race or cage in the average position of the ball with respect to the counter-weight when the ball tends to gravitate and run ahead of the end of the cage or race on the downward swing and at a point on the upward swing when it moves away from the opposite end of the cage represented by the plate 32 and opposed to that at which the roller 33 is located and is free of the ends or sides thereof. In the stalling condition of Figure 4, the escapement mechanism and the carriage work with the magnetic drive to a point where the angle of tilt at which the stalling condition occurs, is overcome.

As the spin axis approaches the vertical, the effect of the pendulosity decreases so that the resultant torque R tends to become normal to X—O with the result that the spin axis tends to even more directly approach the vertical, as depicted in Figure 8. At smaller angles than 50°, e. g., the stalling does not exist with a typical escapement such as referred to and described above.

Figure 6 shows the relation of the average position of the ball to the counter-weight that produces the vectors of Figure 7. In order to do this, the counter-weight must be lighter in weight than the ball with equal radii, and lead it by between 90° and 180°, that is, preferably >90° and <180°, the width or length of the slot or arc of the ball race being such that when the ball moves it should stay within these limits.

In Figure 7, the vectors are represented by the same reference characters as in Figure 5, and this view (Figure 7) shows the action when the ball and counter-weight are related as shown in Figure 6 or in an average position as distinguished from a tendency to a stalling condition. Of course, it is to be understood that the device is never actually stalled or immovable, but that with this erection system, it is always moving, even though at a variable speed. From this it will be observed that in this relation of average position of the ball to the counter-weight, the resultant torque vector R is slightly below the horizontal with the ball and resultant torque vectors in correspondingly shifted positions and the counter-weight at a lesser angle above the horizontal and the pendulosity torque vector correspondingly positioned but shortened with the precession vector V to the left of the vertical spin axis and the precession slightly clockwise. The arcuate or curved arrows in Figures 4 and 7 represent the directions of precession slightly counter-clockwise and clockwise respectively. In order to accomplish this as above stated, the counter-weight 43 must be lighter than the ball 31 and lead it by between 90° and 180°, the width of the slot or length of the arc of the ball race or cage, being such that when the ball moves it stays within these limits.

The resultant operation is depicted by the graph shown in Figure 8 of the drawings with relation to the gyro vertical represented by the light vertical line O and the horizontal axis at H across the axis X approaching 0 or zero. At large angles of tilt, the stalling condition of Figures 4 and 5 causes the precession to tend to be slightly counter-clockwise as represented at D, approaching the vertical asymptotically, while at small angles, the ball is free as in Figures 6 and 7 with a resultant slightly clockwise precession as at E, partially due also to the reduced pendulosity. The path of the precession erecting forces is such as to approach and follow or practically stop at the vertical, but may pass the vertical to a slight degree of the order of less than 1°, say 2 minutes or from 1 minute to 5 minutes, so that at small angles, the ball is free in the average position as shown in Figures 6 and 7 with a resulting slightly clockwise precession as at E and on a shorter arc of the path than the longer arc for larger angles. The net result is that the spin axis of the offset or tilted gyro moves substantially lineally to the vertical more directly or substantially creeps directly to such position from the counter-clockwise position D to the clockwise position with a slight cone at the top H as at F for an extremely short distance or period that is, for an angle of an order of less than 1°, say 2 minutes, or from 1 minute to 5 minutes, but generally not, and therefore, to more quickly and directly erect the spin axis but without or appreciably overrunning or overshooting the vertical and without an appreciable or long spiral precessional movement.

From about 10° in to the vertical, in the precessional movement, the several values balance to give a substantially true lineal movement directly toward the vertical. The net result, starting with a large tilt is that the spin axis moves toward the vertical with a diminishing counter-clockwise spiral which becomes zero at around 30° tilt and shifts to have only a slight clockwise spiral at around 10°, with a lineal erection from about 10° in. There is a "turn error" due to the considerable departure of the dynamic vertical from the true vertical when the craft turns sharply. Hence, it is desirable that the gyro have a reduced erecting tendency when at large angles, as is the case with this device. Since the free condition allows a slower erection rate but is relatively less or without spiraling, it is an advantage that it is carried out to the large angle of 50° at which the tendency of stalling occurs. This feature is very useful in rough air. Also, in the last 10°, the erection rate decreases as the vertical is approached, with the result that the gyro axis does not overshoot the vertical but approaches it asymptotically, that is, creeps directly to the vertical. In the last two degrees, the motion of the cage is substantially uniform. In the steady state, the spin axis typically moves about the vertical in a cone of less than 5 minutes included angle in a clockwise direction for this clockwise-spin gyro.

This is an important feature of the invention in that the restoring precession after the aircraft has come out of a turn is effected more quickly and more directly since the precession in banking or turning is less and therefore the degree of return movement is less and more direct. Actual erection is slower, so any error is less after a turn, and therefore such precession and erection for all, that is small or large, and especially larger angles of tilt of the gyro axis than in other systems, a feature which is very helpful in rough air. Furthermore, in the restoring precession, employing either a slip drive as in the Alkan patent, or a positive drive as above referred to, the necessary erection is slower but not appreciably or objectionably so, with the result that the gyro axis does not overrun or appreciably overshoot the vertical (the reason for not overshooting is the fact of no spiral from 10° to vertical), but approaches it asymptotically, that is, creeps directly to vertical instead of spirally, especially with no appreciable or long spiral precessional movement, due to the fact that the erection component V perpendicular to the resultant torque vector R as shown in Figure 7, is relatively close to the ideal torque in a horizontal plane perpendicular to an ideal precession vertically, to produce the most effective, direct and desirable force or movement tending to maintain a position of stable equilibrium for maintaining the gyro axis vertical or for indicating the true vertical in a gyroscopical device or gyro vertical so as to provide an artificial horizon on a mobile vehicle such for example as an aircraft, especially when the actual horizon is not visible, as in a fog, to assist in navigation and to render gyroscopes more effective as navigational instruments.

Although the present invention is only described and illustrated in detail for two embodiments thereof, it is to be expressly understood that the same is not limited thereto. Various changes may be made in design and arrangement of the embodiments illustrated, as will now be apparent to those skilled in the art. For a definition of the limits of the invention, reference should be had to the appended claims.

What is claimed is:

1. Erecting mechanism for gyroscopes having a rotatable frame driven from the gyro spin axis and provided with a counter-weight carried thereby and movable relative thereto in a restricted arcuate path, a second counter-weight carried by the frame and positioned substantially diametrically opposite the trailing end of the path, said counter-weight being lighter than the aforesaid movable counter-weight and leading it by between 90° and 180°.

2. In a gyro vertical having a rotor spin axis and a carriage driven therefrom at a speed substantially slower than the speed of the axis and having a variable retarding means and a weighted mass movable in a cage thereon in a restricted arc during the rotation of the carriage when tilted, a counter-weight extending for an angle or arc of substantially 60° circumferentially on the carriage and movable therewith, said counter-weight being lighter in weight than the movable mass and so located relative to the movable mass at all positions of rotation of the carriage as to lead it by greater than 90° and less than 180°.

3. The combination with a gyro vertical having a rotatable carriage with an escapement mechanism, and a mass on the carriage and having limited movement relative thereto; of a counter-weight on the carriage lighter than the mass and disposed at a leading angle greater than 90° and less than 180° measured from the mass in the direction of rotation of the carriage.

4. The combination with a gyro vertical having a rotatable carriage with an escapement mechanism, and a mass on the carriage and having limited movement relative thereto; of a counter-weight on the carriage at an angle greater than 90° and less than 180° measured from the mass in the direction of rotation of the carriage, said counter-weight extending circularly on the carriage concentric to the vertical spin axis of the gyroscope and for an arc and angle of substantially 60°.

JOHN A. MEAD.

REFERENCES CITED

The following references are of record in the file of this patent:

UNITED STATES PATENTS

| Number | Name | Date |
|---|---|---|
| 2,159,118 | Alkan | May 23, 1939 |